US010130153B2

(12) United States Patent
Iwatsubo et al.

(10) Patent No.: US 10,130,153 B2
(45) Date of Patent: Nov. 20, 2018

(54) VALVE, BOWL FOR RECEIVING AND/OR MIXING FLUIDS, USE OF A BOWL AND METHOD FOR RECEIVING AND/OR MIXING FLUIDS

(71) Applicant: KAO GERMANY GMBH, Darmstadt (DE)

(72) Inventors: Mitsugo Iwatsubo, Tokyo (JP); Peter Lamboy, Weiterstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 682 days.

(21) Appl. No.: 14/419,600

(22) PCT Filed: Aug. 29, 2013

(86) PCT No.: PCT/EP2013/067938
§ 371 (c)(1),
(2) Date: Feb. 4, 2015

(87) PCT Pub. No.: WO2014/033232
PCT Pub. Date: Mar. 6, 2014

(65) Prior Publication Data
US 2015/0296951 A1 Oct. 22, 2015

(30) Foreign Application Priority Data

Aug. 31, 2012 (EP) .................................... 12182679
Sep. 20, 2012 (EP) .................................... 12185240

(51) Int. Cl.
A45D 19/00 (2006.01)
A45D 19/06 (2006.01)
(Continued)

(52) U.S. Cl.
CPC ............. A45D 19/06 (2013.01); A45D 19/00 (2013.01); B01F 15/026 (2013.01); B67C 3/264 (2013.01);
(Continued)

(58) Field of Classification Search
CPC ................... A45D 19/06; A45D 19/00; A45D 2019/0066; A45D 2200/058;
(Continued)

(56) References Cited

U.S. PATENT DOCUMENTS 3,456,650 A 7/1969 Schwartzman
4,473,097 A * 9/1984 Knickerbocker ....... G01F 19/00
141/113
(Continued)

FOREIGN PATENT DOCUMENTS

EP 2711596 * 3/2014

OTHER PUBLICATIONS

Espacenet—Family list: WO 2014033232, 2 pages printed on Apr. 25, 2018.*

(Continued)

Primary Examiner — Tony G Soohoo
(74) Attorney, Agent, or Firm — Norris McLaughlin P.A.

(57) ABSTRACT

A valve for injecting a fluid into a bowl has a vent with an inlet and a flexible diaphragm for covering the discharge opening of the vent. The diaphragm is connected to a vessel body of a bowl, and the vent is connected to a stand of a bowl. The diaphragm has a closing area for closing the discharge opening and a connecting area for connecting the diaphragm with the vessel body spaced to the vent. At least one window is provided between the closing area and the connecting area.

15 Claims, 4 Drawing Sheets

Figure 1:
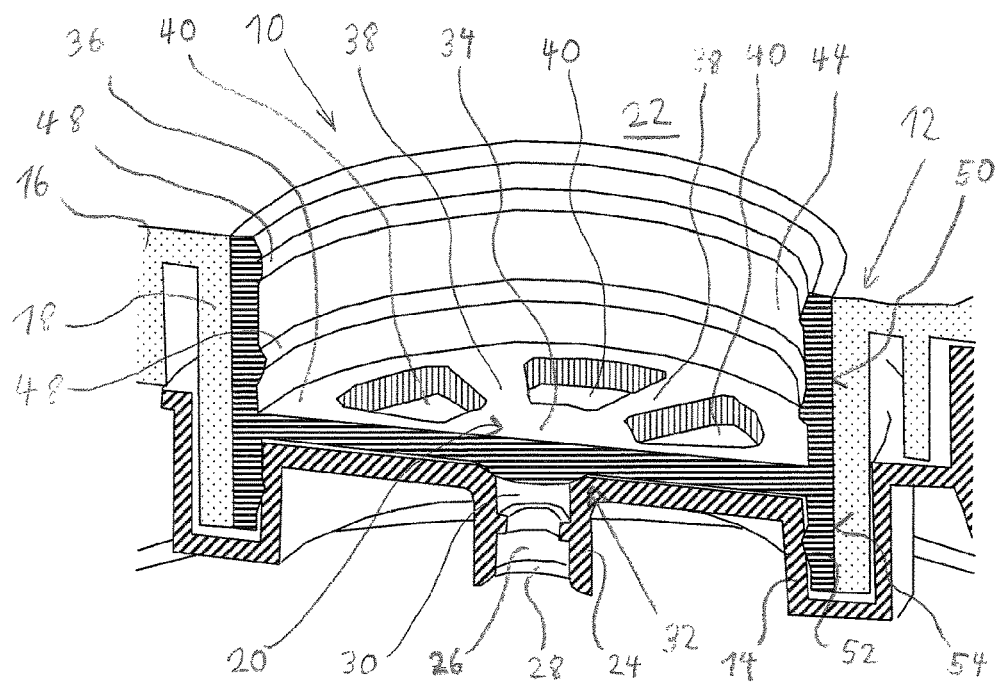

(51) Int. Cl.
*B67D 1/00* (2006.01)
*B67D 1/08* (2006.01)
*B67C 3/26* (2006.01)
*B01F 15/02* (2006.01)
*F16K 15/14* (2006.01)
*F16K 7/12* (2006.01)

(52) U.S. Cl.
CPC ......... *B67D 1/0007* (2013.01); *B67D 1/0894* (2013.01); *F16K 7/12* (2013.01); *F16K 15/144* (2013.01); *A45D 2019/0066* (2013.01); *A45D 2200/058* (2013.01); *B01F 2215/005* (2013.01)

(58) Field of Classification Search
CPC .... B67D 1/0007; B67D 1/0894; B67C 3/264; F16K 7/12; F16K 15/144; B01F 15/026; B01F 2215/005
See application file for complete search history.

(56) References Cited

U.S. PATENT DOCUMENTS

| | | | | |
|---|---|---|---|---|
| 4,712,593 A * | 12/1987 | Zulauf | ................. | B67D 7/0227 141/113 |
| 5,027,872 A * | 7/1991 | Taylor | ................. | B41J 2/17506 141/18 |
| 7,407,055 B2 * | 8/2008 | Rodriguez | ......... | A45D 19/0008 132/208 |
| 7,708,035 B2 * | 5/2010 | Windmiller | .............. | B65D 1/06 141/113 |
| 8,733,599 B2 * | 5/2014 | Hornland | ............. | B65D 83/205 222/135 |
| 8,899,281 B2 * | 12/2014 | Russell | .............. | A47G 19/2205 141/113 |
| 9,327,882 B2 * | 5/2016 | Windmiller | ............ | B65D 47/24 |
| 2004/0178230 A1 | 9/2004 | Feierabend | | |
| 2011/0108147 A1 * | 5/2011 | Carmody | .............. | A61M 39/24 137/843 |
| 2015/0208781 A1 * | 7/2015 | Iwatsubo | .............. | F16K 15/144 366/151.1 |
| 2015/0296951 A1 * | 10/2015 | Iwatsubo | ............... | A45D 19/00 366/138 |

OTHER PUBLICATIONS

International Search Report dated Sep. 25, 2013, dated Oct. 2, 2013.

* cited by examiner

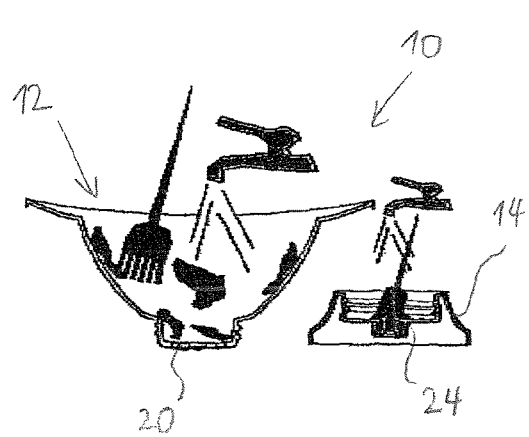 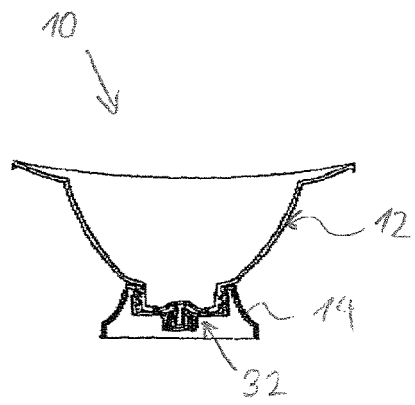
Fig. 8    Fig. 9
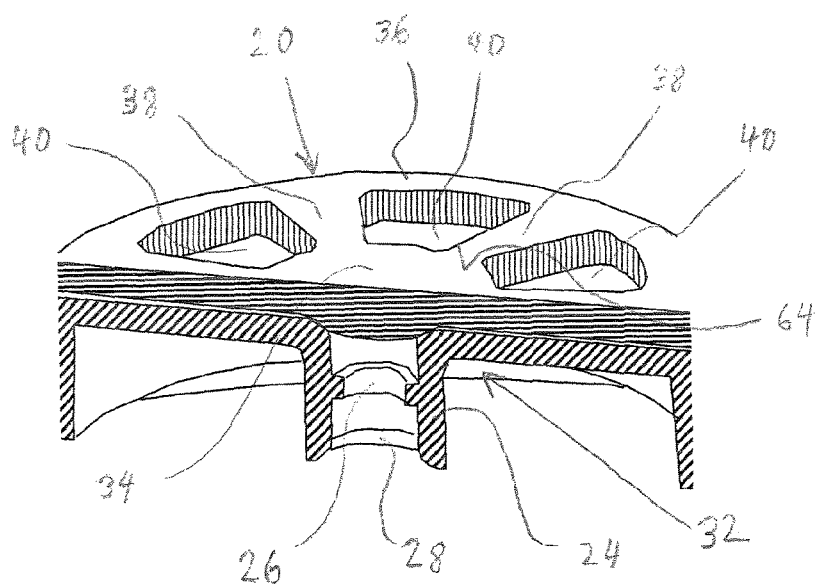
Fig. 10

VALVE, BOWL FOR RECEIVING AND/OR MIXING FLUIDS, USE OF A BOWL AND METHOD FOR RECEIVING AND/OR MIXING FLUIDS

This application is a 371 application of PCT/EP2013/067938 filed Aug. 29, 2013, which claims foreign priority benefit under 35 U.S.C. § 119 of European Application Nos. 12182679.6 filed Aug. 31, 2012 and 12185240.4 filed Sep. 20, 2012, the disclosure of which are incorporated herein by reference.

The invention relates to a valve particularly for injecting a fluid into a bowl, a bowl for receiving and/or mixing fluids, a use of a bowl and a method for receiving and/or mixing fluids by means of which a specific amount particularly of a hair tinting means can be easily injected into a bowl.

A known bowl comprises a rigid vessel for receiving and mixing fluids. The vessel is fixed to a stand by a non-detachable snap-on connection at a circumferential region. The stand is placed below the vessel for placing the vessel onto a ground. The vessel comprises an unidirectional valve for injecting a fluid from below. A measuring cylinder can be pressed into a tubular part of the vessel so that the fluid can be injected into the measuring cylinder via the unidirectional valve. The measuring cylinder is provided with O-rings made from a flexible material to be press fitted into the tubular part of the rigid vessel via the O-rings. There is a permanent need to facilitate the filling of a specific amount of a fluid, particularly a hair tinting means, into a bowl, where the fluid should be mixed and/or applied.

It is an object of the invention providing measures enabling a facilitated injection of a specific amount of a fluid into a bowl adapted for receiving and/or mixing fluids.

The solution of this object is provided according to the invention by a valve according to the features of claim 1, a bowl according to the features of claim 8, a use of such kind of a bowl according to the features of claim 14 and a method for receiving and/or mixing fluids according to the features of claim 15. Preferred embodiments of the invention are given by the dependent claims, which can constitute each solely or in combination an aspect of the invention.

An aspect of the invention is directed to a valve, particularly for a bowl for receiving and/or mixing fluids, comprising a vent for injecting a fluid, wherein the vent comprises an inlet connected to a discharge opening via a discharge channel, and a flexible diaphragm for covering the discharge opening of the vent, wherein the diaphragm comprises a holding collar for receiving a measuring cylinder, particularly in a press-fitted manner.

The holding collar may be a one-piece part of the diaphragm so that the whole diaphragm including the holding collar may be made from the same material, particularly TPE, TPS, TPO, TPV, rubber or silicone. Due to the flexible material of the diaphragm it is possible that the holding collar may receive the measuring cylinder without clearance. Particularly preferred the holding collar is adapted for releasably receiving the measuring cylinder. Particularly it is possible providing a holding force between the measuring cylinder and the holding collar so that the measuring cylinder may not easily fall apart. In addition the diaphragm itself may provide a sealing by means of the holding collar so that a fluid filled into the measuring cylinder via the valve may not escape the measuring cylinder. The measurement of the amount, particularly a filled volume, of a fluid may be measured by means of the measuring cylinder with a high accuracy. After filling a defined amount of a fluid into the measuring cylinder the fluid may be filled into a bowl, wherein particularly the valve is already a part of a bowl so that it is sufficient to detach the measuring cylinder from the holding collar of the diaphragm for filling the content of the measuring cylinder into the bowl. Since the holding collar of the diaphragm may hold and seal the measuring cylinder safely it is not necessary providing additional holding or sealing means made from a separate flexible material at the measuring cylinder. O-rings made from a flexible material and provided at the outer circumference of the measuring cylinder can be saved. Correspondingly it is not necessary providing additional holding or sealing means made from a separate flexible material at a bowl or something else comprising such kind of a valve in order to receive the measuring cylinder in a press-fitted manner. Due to the holding collar provided by the diaphragm itself a secure releasably receipt of the measuring cylinder in a sealed manner can be provided without the need of additional sealing means enabling a facilitated injection of a specific amount of a fluid into a bowl adapted for receiving and/or mixing fluids.

Particularly it is used the insight that in the case that a bowl should be provided with an unidirectional valve the flexible diaphragm of the valve may provide the flexible material for receiving the measuring cylinder in a press-fitted and sealed manner so that a corresponding sealing have not to be provided by the measuring cylinder or a vessel of the bowl. The number of parts can be reduced. Particularly the design of the measuring cylinder and/or of the bowl can be simplified. It is possible that the measuring cylinder is one-piece, particularly the whole measuring cylinder may be constitute of the same plastic material, like SAN or PP, particularly clear or transparent PP. This means no additional flexible material is provided at the measuring cylinder. Further the bowl or at least a rigid vessel body of the bowl for bordering a use volume of the vessel may be one-piece and made from the same material. This means no additional flexible material is provided at the vessel body of the bowl for receiving the measuring cylinder. If so, the vessel body may support the holding collar of the diaphragm so that the vessel body may bear occurring forces, for instance when the measuring cylinder is inserted into the holding collar. The measuring cylinder may be inserted into the holding collar from above downwards in an axial direction towards the vent of the valve. When the measuring cylinder is received by the holding collar, the holding collar may contact the outer circumference of the measuring cylinder with at least a part of the holding collar. In the designated received state the measuring cylinder may contact the diaphragm with its face side so that a defined axial position of the measuring cylinder inside the holding collar is given. The measuring cylinder may comprise a scale particularly for measuring a volume of a fluid. Since the axial position of the measuring cylinder inside the holding collar may be defined and a sealing preventing a fluid filled into the measuring cylinder from escaping the measuring cylinder by means of the holding collar may be provided, an accurate measuring of the amount of the filled fluid by means of the measuring cylinder may be provided.

The vent and the diaphragm may constitute an unidirectional valve. The diaphragm is particularly made from an elastomeric material. Particularly the diaphragm contacts the vent such that the diaphragm covers the material of the vent forming the discharge opening. The diaphragm may contact the vent along a circumferential line and/or at least a main part of a tip area of the vent pointing away from the inlet. When no pressure is applied the diaphragm may close the vent. When a sufficient pressure is present in the valve, particularly when the content of an aerosol can and/or of a pump dispenser is injected into the vent, the diaphragm may open the vent, for instance by being lifted from the vent. The vent may press a part of the diaphragm upwards so that the diaphragm may be elastically deformed by the vent. The bended diaphragm may provide a spring force which provides at least a part of a closing force for closing the discharge opening of the vent by means of the diaphragm. A minimum closing force of the diaphragm to the vent may be ensured. Further an increasing filling level of a fluid inside the vessel increases the closing force and the sealing effect of the diaphragm. Particularly the inlet of the vent may be designed for being put onto the outlet stem of an aerosol can and/or of a pump dispenser.

Particularly the diaphragm comprises a closing area for closing the discharge opening and a connecting area for connecting the diaphragm with a part, particularly a vessel of a bowl, spaced to the vent, wherein at least one window is provided between the closing area and the connecting area, wherein the window is adapted for providing a fluid communication between the discharge channel and the measuring cylinder. Particularly the connecting area is radially spaced to the vent, wherein the closing area is connected to the connecting area particularly via bridges. When a sufficient pressure is present inside the discharge channel, the closing area of the diaphragm may be lifted from the discharge opening so that a pressurized fluid may flow from the discharge channel to the measuring cylinder received by the holding collar via the window passing the diaphragm. Due to the comparatively large radial extension of the diaphragm a sufficient flexibility of the diaphragm for closing and/or opening the discharge opening may be easily provided. Due to the spaced arrangement of the connecting area to the vent the connection of the diaphragm and the vent with different parts is enabled. When these different parts are releasably connected with each other a cleaning of the valve is facilitated. Particularly the diaphragm can be easily cleaned at a contact surface of the closing area pointing towards the discharge opening.

Particularly the connecting area is radially spaced to the closing area, wherein the connecting area is connected with the closing area via bridges, wherein particularly each window is bordered by the closing area, the connecting area and two bridges. For instance the window may be designed as parts stamped out of the material of the diaphragm. Each window may be bordered by an outer rim defined by the material of the connecting area, an inner rim defined by the material of the closing area and two lateral rims defined by the material of the associated bridges. Particularly the radial outer rim of several, particularly all, windows, are arranged on the same radius so that the connecting area may have a mainly ring shaped forming. Particularly the radial inner rim of several, particularly all, windows, are arranged on the same radius so that the closing area may have a mainly circle shaped forming, wherein the radial inner rim of the windows is particularly arranged radially outside the discharge opening of the vent and preferably radially outside the material of the vent. Due to the design of the windows the flexibility of the diaphragm and/or a possible volume flow through the diaphragm may be adjusted.

Particularly preferred the holding collar protrudes in a direction away from the vent, wherein particularly the holding collar protrudes from the connecting area. The extension of the holding collar may be arranged mainly perpendicular to the remaining diaphragm. Particularly the holding collar may be designed as a tubular closed ring, particularly comprising in general a mainly circular opening cross section. The holding collar may be adapted contacting a particularly tubular measuring cylinder at its outer circumference, wherein the remaining diaphragm, particularly the connecting area, may be adapted contacting the measuring cylinder at its front face.

Particularly the diaphragm comprises at least one window for providing a fluid communication between the discharge channel and the measuring cylinder, wherein the window is located radially inside the holding collar. Particularly the holding collar may contact an outer circumference of the measuring cylinder. Due to the arrangement of the window radially inside the holding collar the window can be positioned radially inside of the measuring cylinder. The window may be in fluid communication with the measuring volume inside the measuring cylinder, wherein a fluid communication between the measuring volume and the discharge channel may be only established when the closing area of the diaphragm is lifted from the discharge opening due to the pressure inside the discharge channel of a pressurized fluid.

In a further embodiment the holding collar comprises at least one sealing rib for contacting the measuring cylinder pointing radially inwards, wherein the sealing rib is particularly designed as a closed ring. The sealing rib may be provided by a protrusion protruding radially inwards from the holding collar so that the function of a sealing ring, like an O-ring, is provided. Due to the at least one sealing rib a sufficient sealing between the measuring cylinder and the diaphragm may be provided. At the same time a contact area between the holding collar and the measuring cylinder can be reduced, particularly reduced to the area of the sealing ribs pointing radially inwards, so that a friction force when the measuring cylinder is inserted in and/or detached from the holding collar is reduced. Particularly preferred at least two sealing ribs significantly spaced to each others in axial direction of the holding collar are provided so that a tilting tendency of the measuring cylinder inside the holding collar can be reduced. In a preferred alternate embodiment the measuring cylinder comprises at least one, particularly circumferential, nose protruding radially outwards, wherein the nose is particularly adapted for being digged into the material of the holding collar. In this embodiment the nose may provide the function of a sealing rib, so that a sealing rib provided by the holding collar may be omitted. Hence, the holding collar may comprise a mainly smooth inner surface pointing radially inwards towards the measuring cylinder. The inner surface of the holding collar may be free of protruding parts, like sealing ribs, so that the cleaning of the holding collar is facilitated.

Particularly preferred the holding collar comprises a stepped course in axial direction, wherein particularly the opening cross section of the holding collar enlarges in an axial direction pointing away from the vent. Preferably the holding collar may be designed at least at a part like a funnel. The funnel-like shape of the holding collar facilitates the insertion of the measuring cylinder into the holding collar of the diaphragm. If the measuring cylinder is not well aligned when inserted into the holding collar, the measuring cylinder may meet the broader part of the holding collar so that the measuring cylinder does not hit a rigid part. The holding collar may provide a first rough centering of the measuring cylinder and may prevent a damage of the measuring cylinder or other parts during use. Particularly preferred the outer circumference of the measuring cylinder is shaped correspondingly to the particularly funnel-like shape of the holding collar so that in assembled state, when the measuring cylinder is inserted into the holding collar and received by the holding collar, a contact between the holding collar and the measuring cylinder is possible at the narrow part as well as broad part of the holding collar.

Particularly the vent comprises an inlet connected to a discharge opening via a discharge channel, and a flexible diaphragm for covering the discharge opening of the vent, wherein the diaphragm is separated from the vent, wherein the diaphragm is adapted to be connected to a first part, particularly a vessel body of a bowl, and the vent is adapted to be connected to a different second part, particularly a stand of a bowl, wherein the diaphragm comprises a closing area for closing the discharge opening and a connecting area for connecting the diaphragm with the first part spaced to the vent, wherein at least one window is provided between the closing area and the connecting area. The vent and the diaphragm may constitute an unidirectional valve. Since the vent and the diaphragm are not fixed to the same part but to different parts, the diaphragm may be disassembled as a whole from the vent for enabling an easy cleaning of the valve. Cavities, sharp edges or undercuts may be prevented so that areas which are difficult to clean may be omitted. The cleaning of a bowl adapted for receiving and/or mixing fluids comprising such kind of a valve may be facilitated.

A further aspect of the invention is directed to a bowl for receiving and/or mixing fluids, particularly a hair tinting means, comprising a vessel for receiving and/or mixing the fluids, the vessel comprising a rigid vessel body for bordering a use volume, a stand adapted to be placed below the vessel for placing the vessel onto a ground and a valve, which may be designed as previously described, for injecting a fluid into a measuring cylinder and/or into the use volume.

Due to the valve a fluid may be filled into the measuring cylinder from below. The vessel body may comprise a bottom opening closed by the diaphragm so that the fluid can be injected into the use volume from below. After a specific amount of the fluid is injected into the measuring cylinder via the valve, the measuring cylinder can be detached so that the fluid located inside the measuring cylinder may flow automatically into the vessel of the bowl. Not until the measuring cylinder is detached the fluid comes into contact with the vessel body. After the measuring cylinder is detached the filled fluid may be mixed, particularly with further different fluids, and/or applied. Due to the holding collar provided by the diaphragm itself a secure releasably receipt of the measuring cylinder in a sealed manner can be provided without the need of additional sealing means enabling a facilitated injection of a specific amount of a fluid into a bowl adapted for receiving and/or mixing fluids.

Directions and/or relative arrangements like "up", "down", "high", "low", "below", "above", "vertical", "horizontal" and the like are understood as directions and/or relative arrangements with respect to gravity direction in a situation, when the inlet of the valve or a bowl comprising the valve is placed onto a horizontal ground. Particularly the discharge channel of the valve is aligned mainly in vertical direction in the intended use position.

The use volume is a volume inside the vessel which can be filled with a fluid, when the bowl is placed onto a horizontal ground. The use volume is bordered at the bottom be means of the diaphragm and, if so, by a part of the vessel body. The use volume is bordered sideways mainly by the vessel body, particularly by the vessel body only. The use volume is accessible from above, particularly for inserting a tool, for instance a brush, for mixing a fluid inside the use volume and/or for collecting at least a part of the filled fluid for applying the fluid. Particularly a brush is used for mixing a filled mixture of a paste-like or liquid fluid and/or mixing two or more fluids for providing a hair tinting means of a particular color, wherein the mixed hair tinting means may be applied to human hair by means of the same brush. Preferably the same brush is used for cleaning the vessel and/or the stand after use.

The inlet of the valve and the discharge opening of the valve may be connected with each other by a discharge channel formed by the material of the vent. A pressurized fluid of an aerosol can and/or of a pump dispenser, particularly a hair tinting means, may be easily injected into the use volume of the vessel via the unidirectional valve constituted by the vent and the diaphragm. The lowest part of the vent may be higher than a rest surface of the stand for contacting the ground when the bowl is placed onto a ground. The stand may surround and cover an upper part of the aerosol can and/or the pump dispenser so that leaking content, particularly aerosol, may be collected by the stand and may not soil other parts outside the bowl. Further the stand can be safely placed in a correct alignment onto an upper part of the aerosol can and/or the pump dispenser so that an outlet stem of the aerosol can and/or the pump dispenser may not be damaged by the stand.

The vessel body is harder compared to the diaphragm. This means the vessel body is inflexible compared to the diaphragm. However, the vessel body may be made from a plastic material which allows a slight bending of the rigid vessel body. The wording "rigid" is understood such that in contrast to the flexible diaphragm a bending of the vessel body is not intended so that the vessel body is made from a different harder material than the material used for the diaphragm. Particularly the vessel body may comprise a measuring scale for measuring the volume of fluids filled in the vessel. This facilitates the receiving of an intended amount of the fluid and/or mixing of a mixture with predefined ratios of the used components.

Particularly the holding collar of the diaphragm comprises a connecting surface pointing radially outwards, wherein the diaphragm is connected to the vessel body via the connecting surface, particularly by bonding or 2-component injection or insertion molding. The bottom opening of the vessel body can be bordered by a circumferential ring area to which the holding collar of the diaphragm is fixed via the connecting surface.

Preferably the diaphragm is made from flexible material particularly TPE, TPS, TPO, TPV, rubber or silicone and/or the vessel body is made from a thermoplastic material, particularly SAN or PP. The thermoplastic Elastomer (TPE) provides a sufficient flexibility for the diaphragm and is suitable for 2K injection molding. Suitable TPE are styrenic block copolymers, polyolefin blends, elastomeric alloys (TPE-v or TPV), thermoplastic polyurethanes, thermoplastic copolyester or thermoplastic polyamides. Particularly suitable are thermoplastic Elastomer based on olefins (TPO), cross-linked and/or vulcanized thermoplastic Elastomer based on olefins (TPV) or styrol block copolymers (TPS), like SBS, SEBS, SEPS, SEEPS or MBS. Due to the thermoplastic material of the vessel body the vessel body may be harder than the diaphragm and is suitable for 2K injection molding. The vessel body may be particularly made from styrene-acrylonitrile resin (SAN) or polypropylene (PP), particularly clear and/or transparent PP.

Preferably the diaphragm, particularly the connecting area of the diaphragm, comprises an additional collar pointing away from the holding collar, wherein the additional collar provides an additional connecting surface connected with the vessel body. The surface for connecting the diaphragm with the vessel body can be increased. Particularly the additional connecting surface points radially outwards. The additional connecting surface can be flush with the connecting surface of the holding collar, so that the connecting surface may extend below the level of the closing area into the additional collar. The surface of the vessel body connected with the diaphragm can be mainly tubular shaped.

Particularly preferred the diaphragm is connected to the vessel body of the vessel and the vent is connected to the stand, wherein the vessel is releasably connected with the stand, particularly by screwing or clamping, wherein the diaphragm covers the discharge opening for constituting an unidirectional valve in assembled state. Since the vent of the unidirectional valve is not a part of the vessel comprising the diaphragm of the unidirectional valve but part of the stand, the diaphragm may provide a flexible bottom of the vessel covering the other parts of the valve. Cavities, sharp edges or undercuts at the vessel may be prevented so that areas which are difficult to clean may be omitted. Particularly the vessel body and the diaphragm may provide a mainly smooth bordering for the use volume. The diaphragm may be fixed to the vessel body in a manner that a mainly undercut-free, particularly stepless, surface bordering the use volume is provided by the vessel. Due to the smooth surface of the vessel the cleaning of the bowl is facilitated. It is used the insight that the elements for providing the valve do not have to be fixed with each others but may be distributed over different parts, namely the vessel on the one hand and the stand on the other hand, for constituting an unidirectional valve by connecting the vessel to the stand.

Particularly the measuring cylinder is received by the holding collar, particularly in a press-fitted manner. Preferably the measuring cylinder is releasably received by the holding collar. The measurement of the amount, particularly a filled volume, of a fluid may be measured by means of the measuring cylinder with a high accuracy. When the measuring cylinder is detached the fluid flows into the vessel and can be easily mixed and/or applied.

Preferably the measuring cylinder is made one-piece particularly from a plastic material like SAN or PP. This means no additional flexible material is provided at the measuring cylinder. The measuring cylinder does not have to be provided with sealing means. This leads to a simple design of the measuring cylinder and a facilitated manufacturing of the measuring cylinder. Particularly the material of the measuring cylinder is at least partially mainly transparent or translucent. The measuring cylinder can be provided with a scale so that the volume of the fluid filled into the measuring cylinder can be easily measured by determining the filling level of the measuring cylinder be means of the scale watching the outside of measuring cylinder.

Particularly the measuring cylinder comprises at least one, particularly circumferential, nose protruding radially outwards, wherein the nose is particularly adapted for being digged into the material of the holding collar. The nose may provide a safe connection of the measuring cylinder with the holding collar. The measuring cylinder can be press-fitted with the holding collar via the at least one nose. A contact area between the holding collar and the measuring cylinder can be reduced, particularly reduced to the area of the at least one nose pointing radially inwards, so that a friction force when the measuring cylinder is inserted in and/or detached from the holding collar is reduced. Particularly preferred at least two noses significantly spaced to each others in axial direction of the measuring cylinder are provided so that a tilting tendency of the measuring cylinder inside the holding collar can be reduced. Particularly preferred the nose is shaped as a closed ring, so that the circumferential nose may provide the function of a sealing rib. Particularly the measuring cylinder comprises the at least one circular nose, wherein at the same time the holding collar comprises a mainly smooth inner surface pointing radially inwards towards the measuring cylinder. The inner surface of the holding collar may be free of protruding parts, like sealing ribs, so that the cleaning of the holding collar is facilitated.

Particularly preferred the measuring cylinder comprises a stepped course in axial direction, wherein particularly the outer circumference of the measuring cylinder narrows inside the holding collar in an axial direction pointing towards the vent. Preferably the measuring cylinder may be designed at least at a part like a funnel. The funnel-like shape of the measuring cylinder facilitates the insertion of the measuring cylinder into the holding collar of the diaphragm and may provide a first rough centering of the measuring cylinder. Particularly preferred the inner circumference of the holding collar is shaped correspondingly to the particularly funnel-like shape of the measuring cylinder so that in assembled state, when the measuring cylinder is inserted into the holding collar and received by the holding collar, a contact between the holding collar and the measuring cylinder is possible at the narrow part as well as the broad part of the holding collar. Particularly the measuring cylinder may comprise a circumferential chamfer at its front end pointing towards the discharge channel. Due to the chamfer the inserting and centering of the measuring cylinder is facilitated. Further a free space in the corner region between the holding collar and the connecting area of the diaphragm can be provided so that elastically deformed parts of the diaphragm can be pressed into the free space without blocking the insertion of the measuring cylinder into the holding collar.

An independent invention, which may or may not be used in combination with the valve and or the bowl as previously described, is directed to a valve, particularly for injecting a fluid into a bowl, comprising a vent for injecting a fluid, wherein the vent comprises an inlet connected to a discharge opening via a discharge channel, and a flexible diaphragm for covering the discharge opening of the vent, wherein the diaphragm is separated from the vent, wherein the diaphragm is adapted to be connected to a first part, particularly a vessel body of a bowl, and the vent is adapted to be connected to a different second part, particularly a stand of a bowl, wherein the diaphragm comprises a closing area for closing the discharge opening and a connecting area for connecting the diaphragm with the first part spaced to the vent, wherein at least one window is provided between the closing area and the connecting area. The valve may be further designed as described with respect to the previously described valve.

The vent and the diaphragm may constitute an unidirectional valve. Since the vent and the diaphragm are not fixed to the same part but to different parts, the diaphragm may be disassembled as a whole from the vent for enabling an easy cleaning of the valve. Cavities, sharp edges or undercuts may be prevented so that areas which are difficult to clean may be omitted. The cleaning of a bowl adapted for receiving and/or mixing fluids comprising such kind of a valve may be facilitated.

The diaphragm may extend quite far in radial direction so that it is not necessary providing a connection of the diaphragm with the first part via the connecting area close to the vent. The designated connection of the diaphragm with the first part can be designed with a stronger focus on a facilitated cleaning, wherein a design rule for providing the unidirectional valve at a small space can be omitted or lesser weighted without affecting the functionality of the valve or a device comprising such kind of a valve. Particularly the connecting area is radially spaced to the vent, wherein the closing area is connected to the connecting area particularly via bridges. Due to the spaced arrangement of the connecting area to the vent the connection of the diaphragm and the vent with different parts is facilitated. Particularly a simple geometry for the first part and the second part can be chosen so that cavities, sharp edges or undercuts may be prevented. Due to the comparatively large radial extension of the diaphragm a sufficient flexibility of the diaphragm for closing and/or opening the discharge opening may be easily provided The diaphragm is particularly made from an elastomeric material, particularly TPE. Particularly the diaphragm contacts the vent such that the diaphragm lay on the material of the vent forming the discharge opening. The diaphragm may contact the vent along a circumferential line and/or at least a main part of a tip area of the vent pointing away from the inlet particularly to a use volume of a bowl. When no pressure is applied the diaphragm may close the vent. When a sufficient pressure is present in the valve, particularly when the content of an aerosol can and/or of a pump dispenser is injected into the vent, the diaphragm may open the vent, for instance by being lifted from the vent. Particularly the inlet may be designed for being put onto the outlet stem of an aerosol can and/or of a pump dispenser.

Particularly all previously described inventions may be further designed as described in the following.

Particularly preferred the connecting area of the diaphragm is arranged at least partially on a level below the closing area in the designated use position for pressing the closing area onto the discharge opening of the vent. The diaphragm may be elastically deformed such in the designated use position that the vent of the stand may press a part of the diaphragm upwards so that the closing area of the diaphragm is positioned higher than the connecting area. The bended diaphragm may provide a spring force which provides at least a part of a closing force for closing the discharge opening of the vent by means of the diaphragm. A minimum closing force of the diaphragm to the vent may be ensured. Further an increasing filling level of a fluid inside the vessel increases the closing force and the sealing effect of the diaphragm.

Preferably a part of the diaphragm, particularly the closing area of the diaphragm or even the whole diaphragm, arranged above the discharge channel, is positioned on a different level than the vent. In the designated use position the vent may be positioned below the diaphragm for injecting a fluid from below into a bowl via the valve. If so, the diaphragm, particularly the closing area of the diaphragm, may comprise a part reaching slightly into the discharge channel of the vent, particularly for providing a kind of a plug. Besides the part of the diaphragm reaching into the discharge channel it is preferred that the whole diaphragm is arranged on a different level, particularly above the vent. The arrangement of the vent and the diaphragm on different levels particularly without reaching into a level where the other part is positioned facilitates the distribution of the diaphragm and the vent over different parts. Particularly cavities, sharp edges or undercuts may be prevented.

Particularly the first part connected with the diaphragm and the second part connected with the vent are provided, wherein the first part is releasably connected with the second part, particularly by screwing or clamping, wherein the diaphragm covers the discharge opening for constituting an unidirectional valve. For instance the first part and the second part may comprise a screw thread or parts of a clip connection. In the designated use position when the first part is connected with the second part the diaphragm covers the vent for constituting the unidirectional valve. In released state the first part together with the diaphragm and/or the second part together with the vent can be easily cleaned separately. Particularly a cleaning of the contact surfaces between the diaphragm and the vent is enabled or at least facilitated.

Particularly the connecting area is radially spaced to the closing area, wherein the connecting area is connected with the closing area via bridges, wherein particularly each window is bordered by the closing area, the connecting area and two bridges. For instance the window may be designed as parts stamped out of the material of the diaphragm. Each window may be bordered by an outer rim defined by the material of the connecting area, an inner rim defined by the material of the closing area and two lateral rims defined by the material of the associated bridges. Particularly the radial outer rim of several, particularly all, windows, are arranged on the same radius so that the connecting area may have a mainly ring shaped forming. Particularly the radial inner rim of several, particularly all, windows, are arranged on the same radius so that the closing area may have a mainly circle shaped forming, wherein the radial inner rim of the windows is particularly arranged radial outwards with respect to the discharge opening of the vent and preferably radial outwards with respect to the material of the vent. Due to the design of the windows the flexibility of the diaphragm and/or a possible volume flow through the diaphragm may be adjusted.

An further aspect of the invention is directed to a bowl for receiving and/or mixing fluids, particularly a hair tinting means, comprising a vessel for receiving and/or mixing the fluids, the vessel comprising a rigid vessel body for bordering a use volume, and a stand adapted to be placed below the vessel for placing the vessel onto a ground, the stand comprising a vent for injecting a fluid from below, wherein the vessel comprises a flexible diaphragm for covering the vent, wherein the diaphragm and the vent constitute an unidirectional valve when the vessel is received by the stand in a designated use position.

Particularly the unidirectional valve is designed like the valve as previously described. Since the vent of the unidirectional valve is not a part of the vessel comprising the diaphragm of the unidirectional valve but part of the stand, the diaphragm may provide a flexible bottom of the vessel covering the other parts of the unidirectional valve. Cavities, sharp edges or undercuts at the vessel may be prevented so that areas which are difficult to clean may be omitted.

Particularly the vessel body and the diaphragm may provide a mainly smooth bordering for the use volume. The diaphragm may be fixed to the vessel body in a manner that a mainly undercut-free, particularly stepless, surface bordering the use volume is provided by the vessel. Due to the smooth surface of the vessel the cleaning of the bowl is facilitated. It is used the insight that the elements for providing the unidirectional valve do not have to be fixed with others but may be distributed over different parts, namely the vessel on the one hand and the stand on the other hand, for constituting the unidirectional valve by connecting the vessel to the stand.

In the designate use position of the bowl, when the vessel is held by the stand and particularly connected to the stand, the diaphragm covers the vent. Particularly the diaphragm contacts the vent such that the diaphragm lay on the material of the vent forming a discharge opening. Since the diaphragm is flexible the risk is reduced that the vessel, particularly the bottom of the vessel, may be damaged by an impact of a tool used inside the vessel, particularly for mixing a fluid inside the use volume.

The use volume is a volume inside the vessel which can be filled with a fluid, when the bowl is placed onto a horizontal ground. The use volume is bordered at the bottom be means of the diaphragm and, if so, by a part of the vessel body. The use volume is bordered sideways mainly by the vessel body, particularly by the vessel body only. The use volume is accessible from above, particularly for inserting a tool, for instance a brush, for mixing a fluid inside the use volume and/or for collecting at least a part of the filled fluid for applying the fluid. Particularly a brush is used for mixing a filled mixture of a paste-like or liquid fluid and/or mixing two or more fluids for providing a hair tinting means of a particular color, wherein the mixed hair tinting means may be applied to human hair by means of the same brush. Preferably the same brush is used for cleaning the vessel and/or the stand after use.

An inlet of the valve located in the stand may be provided by the valve particularly on the opposite site to the tip area, wherein the inlet may point away from the use volume, particularly mainly downwards when the bowl is placed on a horizontal ground. The inlet of the valve and the discharge opening of the valve may be connected with each other by a discharge channel formed by the material of the vent. A pressurized fluid of an aerosol can and/or of a pump dispenser, particularly a hair tinting means, may be easily injected into the use volume of the vessel via the unidirectional valve constituted by the vent of the stand and the diaphragm of the vessel. The lowest part of the vent may be higher than a rest surface of the stand for contacting the ground when the bowl is placed onto a ground. The stand may surround and cover an upper part of the aerosol can and/or the pump dispenser so that leaking content, particularly aerosol, may be collected by the stand and may not soil other parts outside the bowl. Further the stand can be safely placed in a correct alignment onto an upper part of the aerosol can and/or the pump dispenser so that a valve of the aerosol can and/or the pump dispenser may not be damaged by the stand.

The vessel body is harder compared to the diaphragm. This means the vessel body is inflexible compared to the diaphragm. However, the vessel body may be made from a plastic material which allows a slight bending of the rigid vessel body. The wording "rigid" is understood such that in contrast to the flexible diaphragm a bending of the vessel body is not intended so that the vessel body is made from a different harder material than the material used for the diaphragm. Particularly the vessel body may comprise a measuring scale for measuring the volume of fluids filled in the vessel. This facilitates the receiving of an intended amount of the fluid and/or mixing of a mixture with predefined ratios of the used components.

Particularly the vessel body comprises a bottom opening closed by the diaphragm, wherein the diaphragm is fixed to the vessel body, particularly by 2-component injection or insertion molding. The bottom opening of the vessel body can be bordered by a circumferential ring area to with the diaphragm is fixed. Due to the two-component injection molding ("2K injection molding") and/or two-component insertion molding the vessel may be manufactured by one injection molding process using two different materials for the vessel body and the diaphragm. Two shots for injecting the different material can be performed in one injection molding process. Compared to overmolding the first injected polymer is still hot and has not shrunk yet, when the second polymer is injected. This reduces the risk of burrs being formed on the second polymer. This leads to a smooth surface of the vessel which can be easily cleaned. Further a short cycle time for manufacturing the vessel is gained and no manual insertion is required, so that the risk of damaging the first component is reduced.

Preferably the diaphragm is made from TPE, particularly TPS, TPO, TPV, rubber or silicone and/or the vessel body is made from a thermoplastic material, particularly SAN or PP. The thermoplastic Elastomer (TPE) provides a sufficient flexibility for the diaphragm and is suitable for 2K injection molding. Suitable TPE are styrenic block copolymers, polyolefin blends, elastomeric alloys (TPE-v or TPV), thermoplastic polyurethanes, thermoplastic copolyester or thermoplastic polyamides. Particularly suitable are thermoplastic Elastomer based on olefins (TPO), cross-linked and/or vulcanized thermoplastic Elastomer based on olefins (TPV) or styrol block copolymers (TPS), like SBS, SEBS, SEPS, SEEPS or MBS. Due to the thermoplastic material of the vessel body the vessel body may be harder than the diaphragm and is suitable for 2K injection molding. The vessel body may be particularly made from styrene-acrylonitrile resin (SAN) or polypropylene (PP), particularly clear and/or transparent PP.

Particularly preferred the vessel is releasably connectable with the stand, particularly by screwing or clamping. For instance the stand and the vessel body may comprise a screw thread or parts of a clip connection. In the designated use position when the vessel is connected with the stand the diaphragm covers the vent for constituting the unidirectional valve. In released state the vessel and/or the stand can be easily cleaned separately. Particularly a cleaning of the contact surfaces between the diaphragm and the vent is enabled or at least facilitated.

It is possible that the diaphragm comprises an inlet means, particularly an opening, wherein the diaphragm is adapted to close the inlet means by means of the flexible material of the diaphragm. The inlet means may be arranged in the closing area for closing the discharge opening. Du to the flexibility of the diaphragm the inlet means can be opened and closed by the material of the diaphragm. When the pressure of an injected fluid applies to the diaphragm the material of the diaphragm may bend away opening an inlet for injecting the fluid into the vessel. When no pressure applies to the diaphragm the material of the diaphragm may elastically bend back closing the inlet. In the alternate the closing and opening of the vent is performed by bending the diaphragm only. If a pressure inside the discharge channel of the vent is higher than the sum of a hydrostatic pressure onto the diaphragm and a spring force provided from the diaphragm towards the vent, the diaphragm may be lifted from the discharge opening so that the valve is opened. The fluid may leave the discharge opening and may pass the closing area of the diaphragm through windows in the diaphragm arranged radially outwards to the closing area. The diaphragm may comprise a sufficient flexibility for being lifted, for instance by connecting the closing area to the connecting area via bridges.

Preferably the diaphragm is adapted to increase a closing force for closing the discharge opening and/or the inlet means when the hydrostatic pressure above the inlet means increases. When a fluid is filled into the vessel the hydrostatic pressure of the fluid may increase the sealing effect of the diaphragm. The hydrostatic pressure may bend the diaphragm such that the discharge opening and/or the inlet means may be closed. For example the hydrostatic pressure of a filled fluid may press a part of the diaphragm slightly into the discharge channel of the vent so that the diaphragm may provide the function of a plug. The flexibility of the diaphragm may be chosen such that the diaphragm may be elastically deformed into the discharge channel by a suitable hydrostatic pressure. A leaking of the filled fluid via the diaphragm may be prevented.

Preferably the connecting area of the diaphragm comprises an extension protruding mainly upwards and/or mainly downwards, wherein the extension is fixed to the vessel body. Due to the extension of the connecting area particularly in vertical direction a surface for connecting the diaphragm with the vessel body is increased so that a good superficial bonding can be provided.

A further aspect of the invention is directed to a use of one of the bowls, which may be designed as previously described, for receiving and/or mixing fluids, particularly a hair tinting means. Preferably due to the holding collar provided by the diaphragm itself a secure releasably receipt of the measuring cylinder in a sealed manner can be provided without the need of additional sealing means enabling a facilitated injection of a specific amount of a fluid into a bowl adapted for receiving and/or mixing fluids. Preferably since the vent of the unidirectional valve is not a part of the vessel comprising the diaphragm of the unidirectional valve but part of the stand, the vessel body and the diaphragm may provide a smooth surface of the vessel so that the cleaning of the bowl is facilitated when the bowl is used for receiving and/or mixing fluids.

A further aspect of the invention is directed to a method for receiving and/or mixing fluids, particularly a hair tinting means, comprising the steps of providing one of the bowls, which may be designed as previously described, wherein the vessel is connected with the stand, connecting the vent of the stand with a discharge stem of an aerosol can and/or pump dispenser, subsequently injecting a fluid of the aerosol can and/or a the pump dispenser into the vessel via the unidirectional valve of the bowl, subsequently mixing and/or applying the at least one fluid located inside the vessel, subsequently detaching the vessel from the stand and subsequently cleaning the vessel separated from the stand. Since the vent of the unidirectional valve is not a part of the vessel comprising the diaphragm of the unidirectional valve but part of the stand, the vessel body and the diaphragm may provide a smooth surface of the vessel so that the cleaning of the bowl is facilitated. Particularly a cleaning of the contact surfaces between the diaphragm and the vent is enabled or at least facilitated.

Particularly the vessel and the stand are cleaned at different times and/or different places. Since the bowl can be cleaned in a state when the vessel is separated from the stand each part can be cleaned independently from the other. Particularly a cleaning of surfaces between the vessel and the stand is enabled or at least facilitated.

Preferably the vessel and/or the stand are cleaned by brushing and/or rinsing. The rinsing may be performed by using water particularly in the case of water soluble fluids and/or by using a suitable solvent particularly in the case of lipophilic fluids. Since the vessel and/or the stand may provide mainly smooth surfaces without sharp edges or undercuts a facilitated cleaning by brushing and/or rinsing with water leads to good cleaning results. Particularly a brush is used which is also used for mixing and/or applying the fluids so that the brush itself can be cleaned at the same time.

Particularly the vessel is connected with the stand after cleaning the vessel and/or the stand. In cleaned state the vessel and the stand may be connected with each other so that the bowl is prepared for the next use. Particularly the vessel and the stand are connected with each others in dry state particularly when the vessel and the stand are dried after a cleaning by rinsing.

Figure 2:
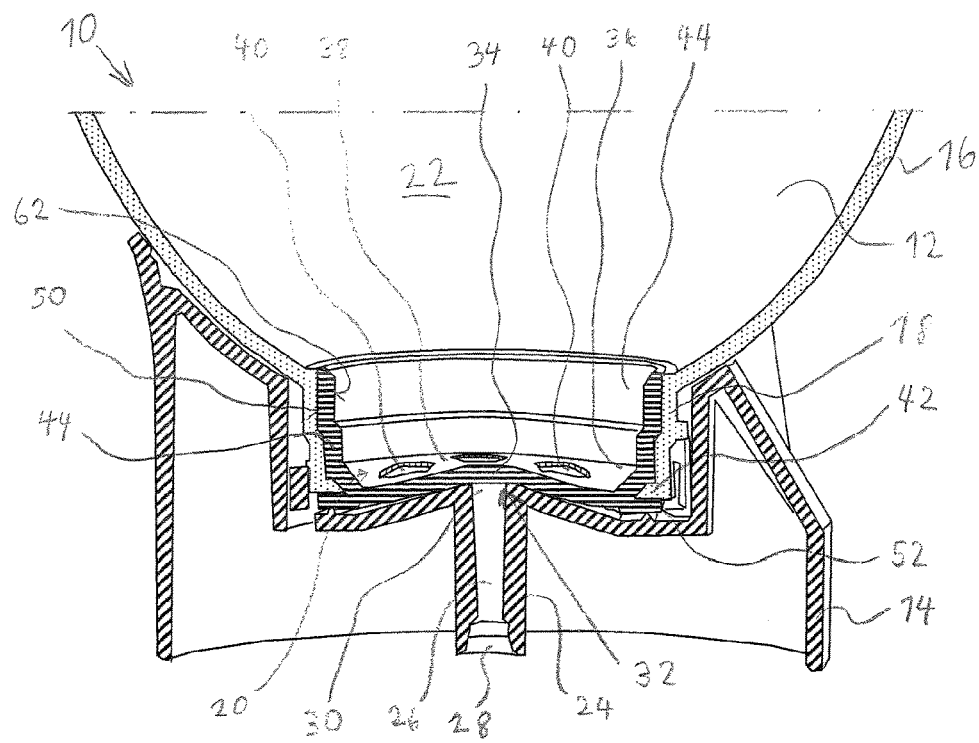
Figure 3:
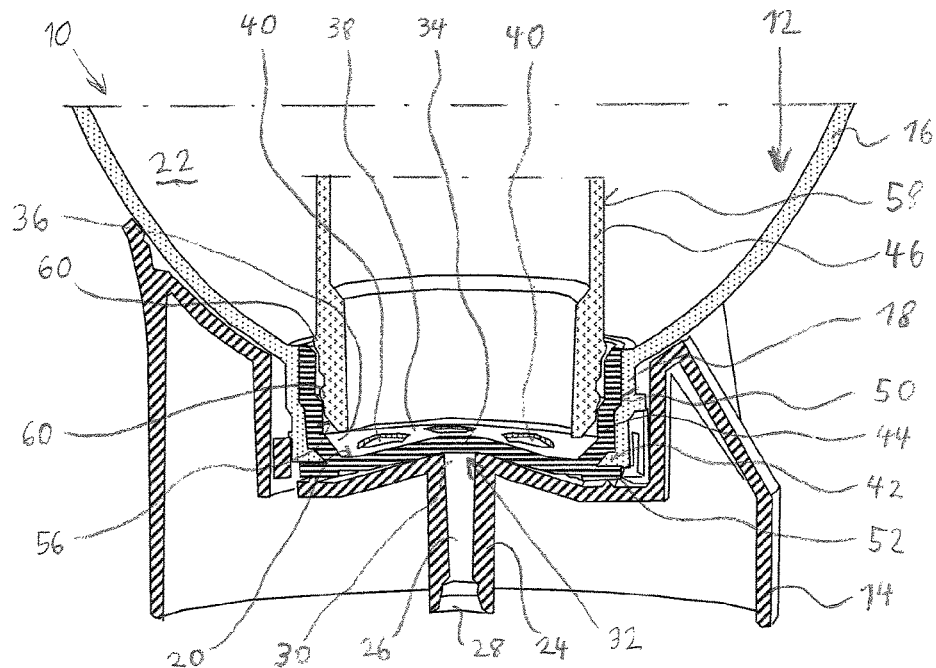
Figure 4:
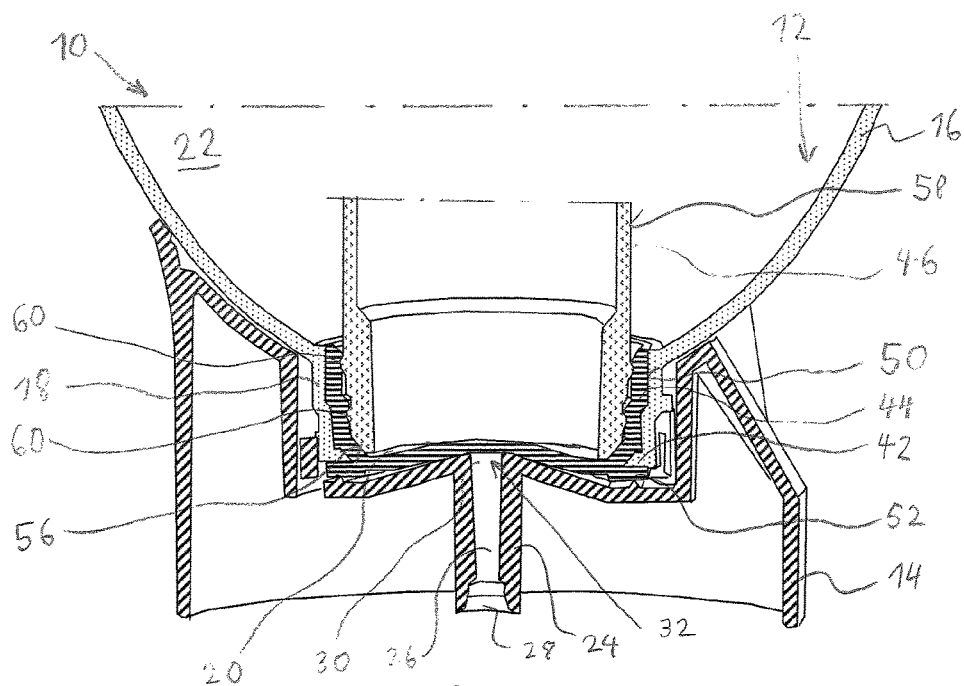
Figure 5:
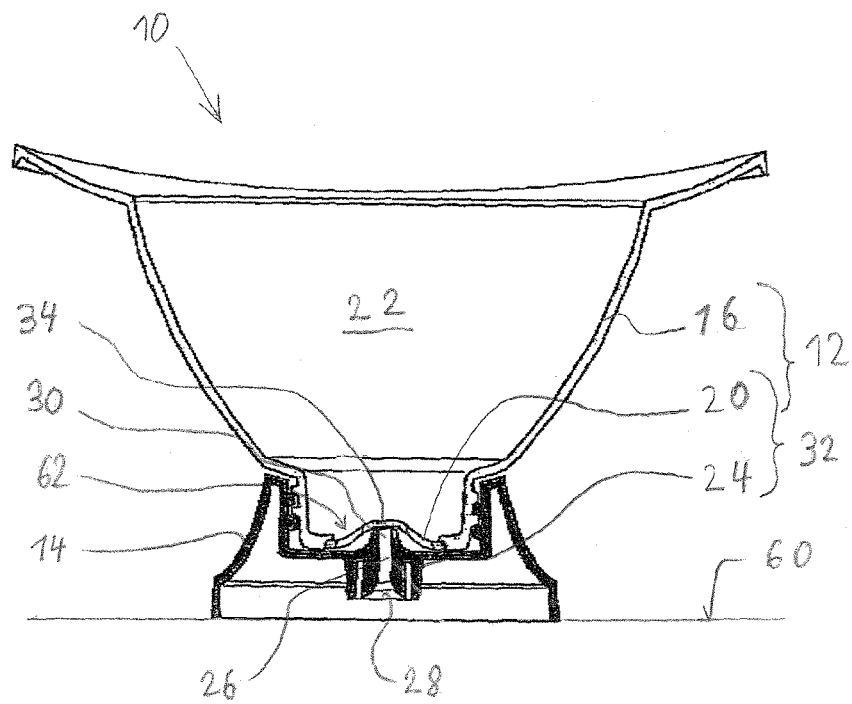
Figures 6, 7:
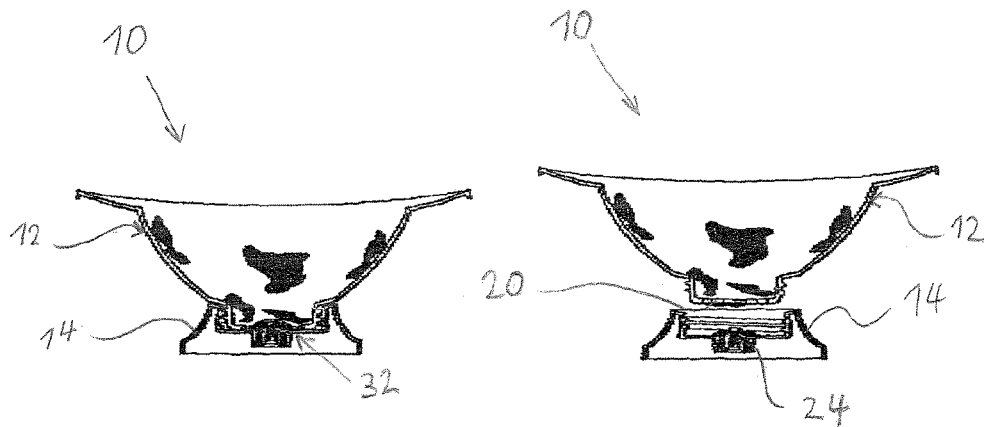

These and other aspects of the invention will be apparent from and elucidated with reference to the embodiments described hereinafter, wherein the described features can constitute each solely or in combination an independent aspect of the invention. In the drawings:

FIG. 1: shows a sectional side view of a bowl according to a first embodiment of the invention, FIG. 2: shows a sectional side view of a bowl according to a second embodiment of the invention, FIG. 3: shows a sectional side view of the bowl of FIG. 2 with a detached measuring cylinder, FIG. 4: shows a sectional side view of the bowl of FIG. 2 with a received measuring cylinder, FIG. 5: a sectional side view of a bowl according to a third embodiment of the invention, FIG. 6: a sectional side view of the bowl of FIG. 5 after using products mixed, FIG. 7: a sectional side view of the bowl of FIG. 6 in detached state, FIG. 8: a sectional side view of the bowl of FIG. 7 during cleaning, FIG. 9: a sectional side view of the bowl of FIG. 8 after cleaning in connected state and FIG. 10: a sectional perspective side view of a detail of the valve used for the bowl of FIG. 5.

The bowl 10 illustrated in FIG. 1 comprises a vessel 12 for receiving and mixing fluids. The vessel 12 is releasably connected to a stand 14. The stand 14 is placed below the vessel 12 for placing the vessel 12 onto a ground. In the illustrated embodiment the vessel 12 consists of a rigid transparent vessel body 16 comprising a mainly tubular part 18 aligned in vertical direction. The opening cross section of the tubular part 18 defines a bottom opening closed by a flexible diaphragm 20. The vessel 12 comprises a use volume 22 bordered by the vessel body 16 and the diaphragm 20. The stand 14 comprises a vent 24 which is one-piece with the stand 14. The vent 24 comprises a discharge channel 26 connecting an inlet 28 with a discharge opening 30 for injecting a fluid into the use volume 22. The discharge opening 30 is covered by the diaphragm 20. The vent 24 and the diaphragm 20 constitute an unidirectional valve 32 in the illustrated assembled state, when the vessel 12 is connected with the stand 14. In the illustrated embodiment the vessel body 16 is screwed with the stand 14 until a point where the vessel body 16 abuts the stand 14. The content of an aerosol can and/or a pump dispenser may be filled into the use volume 22 for instance for mixing a hair tinting means via the unidirectional valve 32. When a sufficient pressure is present inside the vent 24 a closing area 34 of the diaphragm 20 can be lifted from the discharge opening 30 by means of the pressure of the injected fluid.

The diaphragm 20 comprises a connecting area 36 connected to the closing area 34 by bridges 38 providing windows 40 in the diaphragm 20. Due to the bridges 38 the closing area 34 may be easily lifted from the discharge opening 30 when a sufficient pressure of an injected fluid applies in the discharge channel 26. In addition the closing area 34 may be pressed comparably to a plug slightly into the discharge channel 26 when a sufficient hydrostatic pressure is present inside the use volume 22. When the closing area 34 is lifted from the discharge opening 30 the injected fluid may enter the use volume 22 through the windows 40.

The diaphragm 20 comprises a mainly tubular holding collar 44 protruding from the connection area 36 in a direction away from the vent 26. By means of the holding collar 44 a measuring cylinder 46 may be safely held in a position inserted into the holding collar 44 and received by the holding collar 44. The holding collar 44 comprises at least one or at least two annular sealing ribs 48 pointing radially inwards by which the sealing function of O-rings can be provided without additional separate sealing means. The holding collar 44 comprises a connecting surface 50 pointing radially outwards by which the diaphragm 20 is fixed to the tubular part 18 of the vessel body 16 radially spaced to the vent 24. In addition the tubular part 18 may bear loads provided from the received measuring cylinder 46 to the holding collar 44. In the illustrated embodiment an additional collar 52 protruding from the connection area 36 of the diaphragm 20 in a direction away from the holding collar 44. Due to the additional collar 52 the diaphragm 20 can be easily slipped over a part of the stand 14 forming the vent 24 when the vessel 12 is connected with the stand. Further the additional collar 52 provides an additional connecting surface 54 by which the diaphragm 12 can be fixed to the tubular part 18 of the vessel body 16.

The holding collar 44 of the diaphragm 20 of the bowl 10 as illustrated in FIG. 2 comprises a stepped course in axial direction compared to the embodiment illustrated in FIG. 1. The sealing ribs 48 can be replaced by the stepped shape of the holding collar 44 so that the holding collar 44 may comprise a mainly smooth inner surface 62 pointing radially inwards towards the measuring cylinder 46. Further the additional collar 52 is formed such, that between the additional collar 52 and the stepped holding collar 44 a pocket is formed into which a lug 42 of the mainly tubular part 18 of the vessel body 16 protrudes. The diaphragm 20 may be additionally connected with the vessel body 16 by a positive fitting. The tubular part 18 of the vessel body 16 may follow the stepped shape of the holding collar 44 and may be also formed stepped in axial direction. Further in the illustrated embodiment the diaphragm 20 is bend inwards towards the use volume 22 by the vent 24 so that the diaphragm 20 contacts the vent 24 with a defined minimum closing force.

As illustrated in FIG. 3 the measuring cylinder 46 may comprise a chamfer 56 facilitating the insertion of the measuring cylinder 46 into the holding collar 44 as well as a centering of the measuring cylinder 46 with respect to the holding collar 44. The measuring cylinder may comprise an outer circumference surface 58 which may correspond to the forming of the holding collar 44. Particularly the outer circumference surface 58 may be also formed stepped. Preferably the measuring cylinder 46 comprises at least one, particularly circumferential, nose 60 protruding outwards from the outer circumference surface 58. As illustrated in FIG. 4 the nose 60 may dig into the material of the holding collar 44 for providing a safe and sealed connection between the measuring cylinder 46 and the diaphragm. Particularly the measuring cylinder comprises at least one or at least two noses 60 spaced to others in axial direction so that a tilting of the measuring cylinder when received by the holding collar 44 can be prevented.

The bowl 10 illustrated in FIG. 5 particularly differ only from the bowl illustrated in FIG. 1 by lacking the holding collar 44. The bowl 10 illustrated in FIG. 5 comprises the vessel 12 for receiving and mixing fluids. The vessel 12 is releasably connected to the stand 14. The stand 14 is placed below the vessel 12 for placing the vessel 12 onto a ground 60. In the illustrated embodiment the vessel 10 consists of a rigid transparent vessel body 16 comprising a bottom opening 62 closed by the flexible diaphragm 20 bordering a use volume 22 inside the vessel 12. The stand 14 comprises the vent 24 covered by the diaphragm 20 of the vessel 12 in the illustrated designated use position constituting an unidirectional valve 32. Via the unidirectional valve 32 the content of an aerosol can and/or a pump dispenser may be filled into the use volume 22 for instance for mixing a hair tinting means. The vent 24 comprises the discharge channel 26 connecting an inlet 28 with a discharge opening 30 for injecting a fluid into the use volume 26 by lifting the closing area 34 of the diaphragm 20 from the discharge opening 30 by means of the pressure of the injected fluid. In the illustrated embodiment the vessel body 22 is screwed with the stand 14 until a point where the vessel body 22 abuts the stand 14 in the lowest position. In this position the diaphragm 20 is bend inwards towards the use volume 22 by the vent 24 so that the diaphragm 20 contacts the vent 24 with a defined minimum closing force.

When the bowl 10 is used for receiving and/or mixing a hair tinting means the bowl 10 may be soiled after use as illustrated in FIG. 6. For cleaning the bowl 10 the vessel 12 can be detached from the stand 14 by unscrewing the vessel 12 from the stand 14 as illustrated in FIG. 7. In the detached state the diaphragm 20 may elastically bend back to its original shape and/or the shape before assembling. Afterwards the vessel 12 and the stand 14 may be cleaned separately by brushing and rinsing as illustrated in FIG. 8. Particularly the diaphragm 20 and the vent 24 can be easily cleaned so that the functionality of the unidirectional valve 32 constituted by the vent 24 and the diaphragm 20 is not affected for next use. After the vessel 12 and/or the stand 14 are cleaned and, if so, dried the vessel 12 is screwed with the stand 14 so that the bowl 10 is prepared for next use as illustrated in FIG. 9.

As illustrated in FIG. 10 the diaphragm 20 comprises the connecting area 36 by which the diaphragm 20 may be fixed to the vessel body 16 radially spaced to the vent 24. The connecting area 36 is connected to the closing area 34 by bridges 38 providing the windows 40 in the diaphragm 20. Due to the bridges 38 the closing area 34 may be easily lifted from the discharge opening 30 when a sufficient pressure of an injected fluid applies in the discharge channel 26. In addition the closing area 34 may be pressed comparably to a plug slightly into the discharge channel 26 when a sufficient hydrostatic pressure is present inside the use volume 22. When the closing area 34 is lifted from the discharge opening 30 the injected fluid may enter the use volume 22 through the windows 40. In contrast to the design of the diaphragm 20 illustrated in FIG. 1 to FIG. 4 the diaphragm 20 illustrated in FIG. 5 to FIG. 10 particularly comprises a flat and/or besides the windows 40 mainly even front face 64 pointing towards the use volume 22. This means the diaphragm 20 lacks the holding collar 44. When the diaphragm 20 is bend back to its original shape the whole front face 64 is preferably arranged in one plane. No part of the diaphragm 20 protrudes from the diaphragm 20 towards the use volume 22, so that the use volume 22 is not reduced by the volume of the holding collar 44 or a similar protruding part of the diaphragm 20.

The invention claimed is:

1. A bowl adapted for receiving and/or mixing fluids, comprising:
a vessel adapted for receiving and/or mixing the fluids, the vessel comprising a rigid vessel body for bordering a use volume;
a stand placed below, and receiving, the vessel for placing the vessel onto a ground;
a measuring cylinder; and
a unidirectional valve adapted for injecting a fluid into the measuring cylinder and/or into the use volume, wherein the valve comprises
a vent, adapted for injecting a fluid, covered by a flexible diaphragm, wherein the vent comprises an inlet connected to a discharge opening via a discharge channel and the
flexible diaphragm covers the discharge opening of the vent,
wherein the diaphragm comprises a holding collar adapted for receiving the measuring cylinder,
wherein the measuring cylinder is received by the holding collar.

2. The bowl according to claim 1, wherein a connecting area of the diaphragm is arranged at least partially on a level below a closing area in the designated use position for pressing the closing area onto the discharge opening of the vent.

3. The bowl according to claim 1, wherein a part of the diaphragm, arranged above the discharge channel, is positioned on a different level than the vent.

4. The bowl according to claim 1, wherein a first part connected with the diaphragm and a second part connected with the vent are provided, wherein the first part is releasably connected with the second part, screwing or clamping, wherein the diaphragm covers the discharge opening for providing an unidirectional valve.

5. The bowl according to claim 1, wherein a connecting area is radially spaced to a closing area, wherein the connecting area is connected with the closing area via at least two bridges, wherein particularly at least one window is bordered by the closing area, the connecting area and the at least two bridges.

6. The bowl according to claim 1, wherein the vessel body comprises a bottom opening closed by the diaphragm, wherein the diaphragm is fixed to the vessel body by 2-component injection or insertion molding.

7. The bowl according to claim 1, wherein the diaphragm is made from thermoplastic elastomer, thermoplastic elastomer based on olefins, cross-linked and/or vulcanized thermoplastic elastomer based on olefins, cross-linked and/or vulcanized thermoplastic elastomer based on styrol block copolymers, rubber or silicone and/or the vessel body is made from a thermoplastic material being styrene-acrylonitrile resin or polypropylene.

8. The bowl according to claim 1, wherein the diaphragm is adapted to increase a closing force for closing the discharge opening when the hydrostatic pressure above the inlet increases.

9. The bowl according to claim 1, wherein a connecting area of the diaphragm comprises an extension protruding mainly upwards and/or mainly downwards, wherein the extension is fixed to the vessel body.

10. A method comprising
providing the bowl according to claim 1, wherein the vessel is connected with the stand,
connecting the vent of the stand with a discharge stem, and
subsequently injecting a fluid into the vessel via the unidirectional valve provided by the vent and the flexible diaphragm covering the vent.

11. The method according to claim 10, wherein the vessel and the stand are cleaned at different times and/or different places.

12. The method according to claim 10, wherein the vessel and/or the stand are cleaned by brushing and/or rinsing.

13. The method according to claim 10, wherein the vessel is connected with the stand after cleaning the vessel and/or the stand.

14. A bowl adapted for receiving and/or mixing fluids, comprising:
a vessel adapted for receiving and/or mixing the fluids, the vessel comprising a rigid vessel body for bordering a use volume;
a stand adapted to be placed below the vessel for placing the vessel onto a ground;
a measuring cylinder; and
a unidirectional valve for injecting a fluid into the measuring cylinder and/or into the use volume, wherein the unidirectional valve comprises:
a vent adapted for injecting a fluid, wherein the vent comprises an inlet connected to a discharge opening via a discharge channel; and
a flexible diaphragm covering the discharge opening of the vent,
wherein the diaphragm comprises a holding collar adapted for receiving the measuring cylinder,
wherein
the measuring cylinder is received by the holding collar,
the vessel body comprises a bottom opening closed by the diaphragm, wherein the diaphragm is fixed to the vessel body by two-component injection or two-component insertion molding such that the vessel is manufactured by one molding process using two different materials for the vessel body and the diaphragm.

15. The bowl according to claim 14, wherein the diaphragm is made from thermoplastic elastomer, thermoplastic elastomer based on olefins, cross-linked and/or vulcanized thermoplastic elastomer based on olefins, cross-linked and/or vulcanized thermoplastic elastomer based on styrol block copolymers, rubber or silicone and the vessel body is made from a thermoplastic material being styrene-acrylonitrile resin or polypropylene.

* * * * *